United States Patent
Cheng et al.

(10) Patent No.: US 9,244,924 B2
(45) Date of Patent: Jan. 26, 2016

(54) CLASSIFICATION, SEARCH, AND RETRIEVAL OF COMPLEX VIDEO EVENTS

(71) Applicant: SRI INTERNATIONAL, Menlo Park, CA (US)

(72) Inventors: Hui Cheng, Bridgewater, NJ (US); Harpreet Singh Sawhney, Princeton Junction, NJ (US); Ajay Divakaran, Monmouth Junction, NJ (US); Qian Yu, Lawrence, NJ (US); Jingen Liu, Plainsboro, NJ (US); Amir Tamrakar, Philadelphia, PA (US); Saad Ali, East Windsor, NJ (US); Omar Javed, Franklin Park, NJ (US)

(73) Assignee: SRI INTERNATIONAL, Menlo Park, KS (US)

( * ) Notice: Subject to any disclaimer, the term of this patent is extended or adjusted under 35 U.S.C. 154(b) by 144 days.

(21) Appl. No.: 13/737,607

(22) Filed: Jan. 9, 2013

(65) Prior Publication Data

US 2013/0282747 A1 Oct. 24, 2013

Related U.S. Application Data

(60) Provisional application No. 61/637,196, filed on Apr. 23, 2012.

(51) Int. Cl.
*G06F 17/30* (2006.01)

(52) U.S. Cl.
CPC .... *G06F 17/30023* (2013.01); *G06F 17/30784* (2013.01); *G06F 17/30817* (2013.01)

(58) Field of Classification Search
CPC .................. G06F 17/30023; G06F 17/30817; G06F 17/30784
USPC ......................................................... 707/758
See application file for complete search history.

(56) References Cited

U.S. PATENT DOCUMENTS

| | | | |
|---|---|---|---|
| 5,664,227 A * | 9/1997 | Mauldin et al. ............... | 715/203 |
| 5,835,667 A * | 11/1998 | Wactlar et al. ............... | 386/241 |
| 6,188,985 B1 * | 2/2001 | Thrift et al. ................... | 704/275 |
| 6,546,135 B1 * | 4/2003 | Lin et al. ....................... | 382/190 |
| 6,601,026 B2 * | 7/2003 | Appelt et al. ..................... | 704/9 |
| 6,678,689 B2 * | 1/2004 | Yoon et al. | |
| 6,751,776 B1 * | 6/2004 | Gong ............................. | 715/203 |
| 7,143,434 B1 * | 11/2006 | Paek et al. ..................... | 725/142 |
| 7,383,504 B1 * | 6/2008 | Divakaran et al. ............ | 715/723 |
| 7,421,455 B2 * | 9/2008 | Hua et al. | |
| 7,616,816 B2 | 11/2009 | Cheng | |

(Continued)

OTHER PUBLICATIONS

Cheng, Hui, et al., "SRI-Sarnoff AURORA System at TRECVID 2012: Multimedia Event Detection and Recounting", TRECVID 2012, © 2012, 9 pages.*

(Continued)

*Primary Examiner* — R. Stevens
(74) *Attorney, Agent, or Firm* — Barnes & Thornburg LLP; Thomas J. McWilliams; Edward F. Behm, Jr.

(57) ABSTRACT

A complex video event classification, search and retrieval system can generate a semantic representation of a video or of segments within the video, based on one or more complex events that are depicted in the video, without the need for manual tagging. The system can use the semantic representations to, among other things, provide enhanced video search and retrieval capabilities.

45 Claims, 8 Drawing Sheets

(56) References Cited

U.S. PATENT DOCUMENTS

| | | | |
|---|---|---|---|
| 7,818,176 B2* | 10/2010 | Freeman et al. | 704/270 |
| 8,805,030 B2* | 8/2014 | Snoek | 382/118 |
| 8,831,403 B2* | 9/2014 | Patil et al. | 386/241 |
| 2002/0051077 A1* | 5/2002 | Liou et al. | 348/465 |
| 2004/0088723 A1* | 5/2004 | Ma et al. | 725/19 |
| 2004/0120581 A1 | 6/2004 | Ozer et al. | |
| 2009/0299999 A1* | 12/2009 | Loui et al. | 707/5 |
| 2009/0316983 A1 | 12/2009 | Han et al. | |
| 2010/0005485 A1* | 1/2010 | Tian et al. | 725/32 |
| 2011/0243530 A1* | 10/2011 | Kashima et al. | 386/248 |
| 2012/0189284 A1* | 7/2012 | Morrison et al. | 386/282 |
| 2013/0129307 A1* | 5/2013 | Choe et al. | 386/227 |

OTHER PUBLICATIONS

Cheng, Hui, et al., "SRI-Sarnoff AURORA System at TRECVID 2011", TRECVID 2011, © 2011, 10 pages.*

"2012 TREC Video Retrieval Evaluation Notebook Papers", TRECVID 2012, downloaded from: www-nlpir.nist.gov/projects/tvpubs/tv.pubs.12.org.html, © 2012, 12 pages.*

Sanders, Greg, et al., "Multimedia Event Recounting (MER) Evaluation Overview", TRECVID 2012 Multimedia Event Recounting Task, National Institute of Standards and Technology, © 2012, 14 pages.*

"AURORA: Multimedia Event Detection (MED '12)", TRECVID 2012, © 2012, 25 pages.*

Hu, Weiming, et al., "A Survey on Visual Content-Based Video Indexing and Retrieval", IEEE Transactions on Systems, Man, and Cybernetics—Part C: Applications and Reviews, vol. 41, No. 6, Nov. 2011, pp. 797-819.*

Erozel, Guzen, et al., "Natural language querying for video databases", Information Sciences, vol. 178, Issue 12, Elsevier, Inc., Jun. 15, 2008, pp. 2534-2552.*

Yang, Yezhou, et al., "Corpus-Guided Generation of Natural Images", EMNLP '11, Edinburgh, Scotland, UK, Jul. 27-31, 2011, pp. 444-454.*

Pyshkin, Evgeny, et al., "Approaches for Web Search User Interfaces", Journal of Convergence, vol. 1, No. 1, Dec. 2010, pp. 1-8.*

Tan, Chun Chet, et al., "Towards Textually Describing Video Contents with Audio-Visual Concept Classifiers", MM '11, Scottsdale, AZ, Nov. 28-Dec 1, 2011, pp. 655-658.*

Katz, Boris, et al., "Answering Questions about Moving Objects in Surveillance Videos", Proc. of 2003 AAAI Spring Symposium on New Directions in Question Answering, Palo Alto, CA, Mar. 2003, pp. 1-8.*

Cimiano, Philipp, et al., "Towards portable natural language interfaces to knowledge bases—The case of the ORAKEL system", Data & Knowledge Engineering, vol. 65, Issue 2, May 2008, pp. 325-354.*

Fergus, Rob, et al., "Semantic Label Sharing for Learning with Many Categories", ECCV 2010, Part I, LNCS 6311, Springer-Verlag, Berlin, © 2010, pp. 762-775.*

Wang, Gang, et al., "Comparative object similarity for improved recognition with few or no examples", CVPR 2010, San Francisco, CA, Jun. 13-18, 2010, pp. 3525-3532.*

Aytar, Yusuf, et al., "Utilizing Semantic Word Similarity Measures for Video Retrieval", CVPR 2008, Anchorage, AK, Jun. 23-28, 2008, pp. 1-8.*

Jiang, Yu-Gang, et al., "Representations of Keypoint-Based Semantic Concept Detection: A Comprehensive Study", IEEE Transactions on Multimedia, vol. 12, No. 1, Jan. 2010, pp. 42-53.*

Cao, Liangliang, et al., "IBM Research and Columbia University TRECVID-2011 Multimedia Event Detection (MED) System", TRECVID-2011, NIST, Gaithersburg, MD, © 2011, 14 pages.*

Fernández, C., et al., "Determining the best suited semantic events for cognitive surveillance", Expert Systems with Applications, vol. 38, Issue 4, Apr. 2011, pp. 4068-4079.*

Jiang, Yu-Gang, et al., "Columbia-UCF TRECVID 2010 Multimedia Event Detection: Combining Multiple Modalities, Contextual Concepts, and Temporal Matching", TRECVID-2010, NIST, Gaithersburg, MD, © 2010, 10 pages.*

Ksibi, Amel, et al., "Semi-Automatic Soft Collaborative Annotation for Semantic Video Indexing", EUROCON 2011, Lisbon, Portugal, Apr. 27-29, 2011, pp. 1-6.*

Natsev, Apostol, et al., "IBM Research TRECVID-2010 Video Copy Detection and Multimedia Event Detection System", TRECVISD-2010, NIST, Gaithersburg, MD, © 2010, 15 pages.*

Ngo, Chong-Wah, et al., "VIREO at TRECVID 2010: Semantic Indexing, Known-Item Search, and Content-Based Copy Detection", TRECVID-2010, NIST, Gaithersburg, MD, © 2010, 14 pages.*

Qiu, Yu, et al., "Improving News Video Annotation with Semantic Context", DICTA 2010, Sydney, NSW, Australia, Dec. 1-3, 2010, pp. 214-219.*

Smeaton, Alan F., et al., "TRECVID 2010—An Overview of the Goals, Tasks, Data, Evaluation Mechanisms, and Metrics", TRECVID-2010, NIST, Gaithersburg, MD, © 2010, pp. 1-34.*

Snoek, C.G.M., et al., "The MediaMill TRECVID 2009 Semantic Video Search Engine", TRECVID Workshop, © 2009, 14 pages.*

Snoek, C.G.M., et al., "The MediaMill TRECVID 2008 Semantic Video Search Engine", Proc. of the 6th TRECVID Workshop, Gaithersburg, MD, © 2008, 14 pages.* van Gemert, Jan C., et al., "Comparing compact codebooks for visual categorization", Computer Vision and Image Understanding, vol. 114, © 2010, pp. 450-462.*

Vogel, Julia, et al., "Semantic Modeling of Natural Scenes for Content-Based Image Retrieval", International Journal of Computer Vision, vol. 72, No. 2, © 2007, pp. 1343-1355.*

Yuan, Jin, et al., "Utilizing Related Samples to Enhance Interactive Concept-Based Video Search", IEEE Transactions on Multimedia, vol. 13, No. 6, Dec. 2011, pp. 1343-1355.*

Gong, Yihong, et al., "Generating Optimal Video Summaries", ICME 2000, New York, NY, Jul. 30-Aug. 2, 2000, pp. 1559-1562.*

Chen, Bo-Wei, et al., "A Novel Video Summarization Based on Mining the Story-Structure and Semantic Relations Among Concept Entities", IEEE Transactions on Multimedia, vol. 11, No. 2, Feb. 2009, pp. 295-312.*

Tseng, Belle L., et al., "Video Summarization and Personalization for Pervasive Mobile Devices", Storage and Retrieval for Media Databases, Proc. of SPIE, vol. 4676, © 2002, pp. 359-370.*

Wactlar, Howard D., "Informedia—Search and Summarization in the Video Medium", Proc. of the Imagine 2000 Conference, Monaco, Jan. 31-Feb. 2, 2000, 10 pages.*

Siddiquie, Behjat, et al., "Real-Time Recognition of Gesture and Actions Using Stereo," Presented at HSBC Conference, Feb. 9, 2011, 9 pages.

Chen, Hui, et al., "SRI-Sarnoff's AURORA System @ TECVID 2011," Presented at 2011 TREC Video Retrieval Evaluation (TRECVID) Workshop, sponsored by NIST, on Dec. 5-7, 2011, in Gaithersburg, MD, 10 pages.

U.S. Appl. No. 13/493,654 by Cheng, et al., filed Jun. 11, 2012, 39 pages.

"Bag-of-words model in computer vision," available at http://en.wikipedia.org/wiki-bag-of-words_model_in_computer_vision, printed Apr. 4, 2013, 5 pages.

"k-means clustering," available at http://en.wikipedia.org/wiki-k-means_clutstering, printed Apr. 4, 2013, 9 pages.

"Feature detection (computer vision)," available at http://en.wikipedia.org/wiki/Feature_detection_(computer_vision), printed Apr. 4, 2013, 4 pages.

Merler, Michele, et al., "Semantic Model Vectors for Complex Video Event Recognition," IEE Transactions on Multimedia, Sep. 23, 2011, 16 pages.

Aggarwal, J.K., et al., "Human Activity Analysis; A Review," The University of Texas at Austin, Electronics and Telecommunications Research Institute, 47 pages, Oct. 2014.

Yu, Qian, et al., "Multimedia Event Recounting with Concept based Representation," Presented at ACM Multipmedia Conference, 4 pages, (c) 2012.

U.S. Appl. No. 61/637,196, filed Apr. 23, 2012, 30 pages.

Jiang et al., "Consumer Video Understanding: A Benchmark Database and An Evaluation of Human and Machine Performance," ICMR, Apr. 2011, 8 pages.

(56) References Cited

OTHER PUBLICATIONS

Ballan et al., "Semantic annotation of soccer videos by visual instance clustering and spatial/temporal reasoning in ontologies", Springer Science + Business Media, LLC, Aug. 7, 2009, 25 pages.

Bai et al., "Video Semantic Content Analysis based on Ontology," International Machine Vision and Image Processing Conference, Sep. 2007, 8 pages.

"Evaluation of Low-Level Features and their Combinations for Complex Event Detection in Open Source Videos", CVPR 2012 (IEEE Computer Vision and Pattern Recognition Jun. 2012) http://ieeexplore.ieee.org/xpl/articleDetails.jsp?arnumber=6248114, Jun. 16-21, 2012, pp. 3681-3688.

"Video Event Recognition Using Concept Attributes", Applications of Computer Vision (WACV), Jan. 2013 IEEE Workshop on Applications of Computer Vision, available at http://www.cs.ucf.edu/~liujg/papers/liu_wacv2013.pdf, 10 pages.

Ba Tu Truong and Svetha Venkatesh, Video Abstraction: A Systematic Review and Classification, ACM Trans. Multimedia Comput. Commun. Appl. 3,1, Article 3 (Feb. 2007), 37 pages.

* cited by examiner

CLASSIFICATION, SEARCH, AND RETRIEVAL OF COMPLEX VIDEO EVENTS

RELATED APPLICATION

This application claims priority to and the benefit of U.S. Provisional Patent Application Ser. No. 61/637,196, filed Apr. 23, 2012, which is incorporated herein by this reference in its entirety.

GOVERNMENT RIGHTS

This invention was made in part with government support under contract number D11PC20066 awarded by intelligence Advanced Research Projects Activity (IARPA). The Government has certain rights in this invention.

BACKGROUND

With the integration of digital video recording technology into more and more consumer-oriented electronic devices, nearly any person can create a video, at any time, wherever they may be located. Moreover, due to increases in available bandwidth, processing power and storage media, digital videos can be copied, stored, and shared with ease. However, the proliferation of user-generated, unconstrained, or "in the wild" videos on the Internet, home computers, mobile devices, and elsewhere has outpaced advancements in video search and retrieval technology. Many video search engines provide a simple keyword search portal with limited searching assistance. Further, many video search portals require stored videos to be manually classified and tagged. Such manual processing is labor-intensive and its effectiveness is limited because important but less-commonly thought of details may be left out of the tags. In addition, similar videos may be described and tagged in different ways by different users, leading to inconsistent or incomplete search results.

SUMMARY

According to at least one aspect of this disclosure, a video search assistant is embodied in one or more machine readable storage media and accessible by a computing system to assist a user with a video search by receiving a user-specified search request; determining a complex event of interest, based on the user-specified search request; accessing a video event model comprising a plurality of semantic elements associated with a plurality of complex events depicted in a plurality of videos, where each of the semantic elements describing one or more of a scene, an action, an actor, and an object depicted in one or more of the videos; determining, based on the video event model, one or more semantic elements of interest associated with the complex event of interest; and formulating a search for one or more videos depicting the complex event of interest, the search comprising one or more of the semantic elements of interest.

The user-specified search request may include one or more of a textual element, a non-textual visual element, and an audio element. The user-specified search request may include one or more spatio-temporal regions of interest within a video segment. The video search assistant may receive user input relating to the presented semantic elements, and modify the search based on the user input. The video search assistant may identify a video likely depicting the complex event of interest and present a natural language description of the video to a user. The video search assistant may identify a video likely depicting the complex event of interest and present to a user a natural language description of one or more segments of the video that relate to the complex event.

The video search assistant may identify a video likely depicting the complex event of interest and locate, in the identified video, one or more video segments likely depicting the complex event of interest. The video search assistant may determine the complex event of interest based on data stored in a knowledge base comprising one or more of a non-publicly accessible knowledge base and a publicly accessible knowledge base.

The video event model may include data relating each of a plurality of complex event types to an associated set of semantic elements. The video event model may include data relating to a relative evidentiary value associated with one or more of the semantic elements in each of the sets of semantic elements associated with each of the complex event types, and the video search assistant may recognize the complex event based on one or more of the relative evidentiary values. At least a portion of the video event model may be derived using a machine learning technique. At least a portion of the video event model may be generated based on user input. The video event model may include ontological information relating to the complex events and the semantic elements.

The video search assistant may determine the complex event of interest by algorithmically comparing the user-specified search request to one or more of the semantic elements in the video event model. The user-specified search request may include one or more videos, and the video search assistant may determine a complex event of interest likely depicted in the one or more videos without the use of example training videos.

According to at least one aspect of this disclosure, a video search assistant is embodied in one or more machine readable storage media and accessible by a computing system to generate a description of a video to assist with a video search, by accessing a set of semantic elements associated with the video, each of the semantic elements describing one or more of a scene, an action, an actor, and an object depicted in the video; recognizing a complex event as being likely depicted in the video, as evidenced by a plurality of the semantic elements; generating a human-intelligible representation of the complex event and the semantic elements evidencing the complex event, the human-intelligible representation comprising one or more of: a natural language description, one or more non-textual visual elements representative of the natural language description, and one or more audio elements representative of the natural language description; and associating the human-intelligible representation with the video.

The video search assistant may omit from the human-intelligible representation semantic elements that do not evidence the complex event. The video search assistant may present the human-intelligible representation in response to a user-specified search request. The video search assistant may receive user input relating to the human-intelligible representation and modify the video search based on the user input. The video search assistant may determine a relative evidentiary value associated with each of the semantic elements evidencing the complex event and formulate the human-intelligible representation based on the relative evidentiary values.

The video search assistant may determine a temporal, spatial, causal, or other relationship between at least two of the semantic elements evidencing the complex event and include an indication of the relationship in the human-intelligible representation. One or more of the semantic elements evidencing the complex event may relate to audio included in the video, and the video search assistant may include a description of the audio-related semantic element in the human-intelligible representation.

The video search assistant may associate an interactive hyperlink with a semantic element included in the human-intelligible representation and display an indication of the hyperlink in the human-intelligible representation, wherein the hyperlink may be user-activated to locate a portion of the video corresponding to the associated semantic element. The video search assistant may associate an interactive hyperlink with a semantic element included in the human-intelligible representation and display an indication of the hyperlink in the human-intelligible representation, wherein the hyperlink may be user-activated to expand or contract the human-intelligible representation to a different level of detail.

The human-intelligible representation may describe the complex event and the semantic elements evidencing the complex event in an essay-like manner. The human-intelligible representation may describe the complex event and the semantic elements evidencing the complex event in a dialog-like manner.

The video search assistant may recognize the complex event by referencing a video event model comprising data relating each of a plurality of complex event types to an associated set of semantic elements. The video search assistant may assign a relative evidentiary value to one or more of the semantic elements in each of the sets of semantic elements associated with each of the complex event types and recognize the complex event based on one or more of the relative evidentiary values. The video search assistant may determine the set of semantic elements associated with the video by algorithmically extracting a plurality of features from the video and classifying each of the extracted features using a set of classifiers.

According to at least one aspect of this disclosure, a video search assistant is embodied in one or more machine readable storage media and accessible by a computing system to recognize a video as likely depicting a complex event in order to assist with a video search, by identifying a plurality of visual and non-visual features included in the video; deriving a plurality of semantic elements from the visual and non-visual features, each of the semantic elements describing one or more of a scene, an action, an actor, and an object depicted in the video; recognizing a complex event as being likely depicted in the video based on the plurality of semantic elements; and associating the complex event with the video.

The video search assistant may identify the visual and non-visual features by one or more algorithmic feature extraction techniques. The video search assistant may recognize a geographic location of one or more of the scenes depicted in the video and associate the geographic location with one or more of the semantic elements. The video search assistant may recognize audio occurring in the video and associate the audio with one or more of the semantic elements. The video search assistant may recognize speech included in the recognized audio and associate the speech with one or more of the semantic elements. The video search assistant may recognize text depicted in the video and associate the text with one or more of the semantic elements.

The video search assistant may derive one or more of the semantic elements algorithmically using a set of classifiers. The video search assistant may derive one or more of the classifiers using a machine learning technique. The video search assistant may generate one or more of the semantic elements based on user input.

The video search may recognize the complex event by referencing a video event model comprising data relating each of a plurality of complex event types to an associated set of semantic elements. The video search assistant may assign a relative evidentiary value to one or more of the semantic elements in each of the sets of semantic elements associated with each of the complex event types and recognize the complex event based on one or more of the relative evidentiary values.

The video search assistant may create at least a portion of the video event model using a machine learning technique. The video event model may include ontological information relating to the complex events and the semantic elements. The video search assistant may recognize another video as likely depicting the complex event without the use of example training videos. The video search assistant may recognize the other video as likely depicting the complex event by comparing a semantic description of the other video with the plurality of semantic elements.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
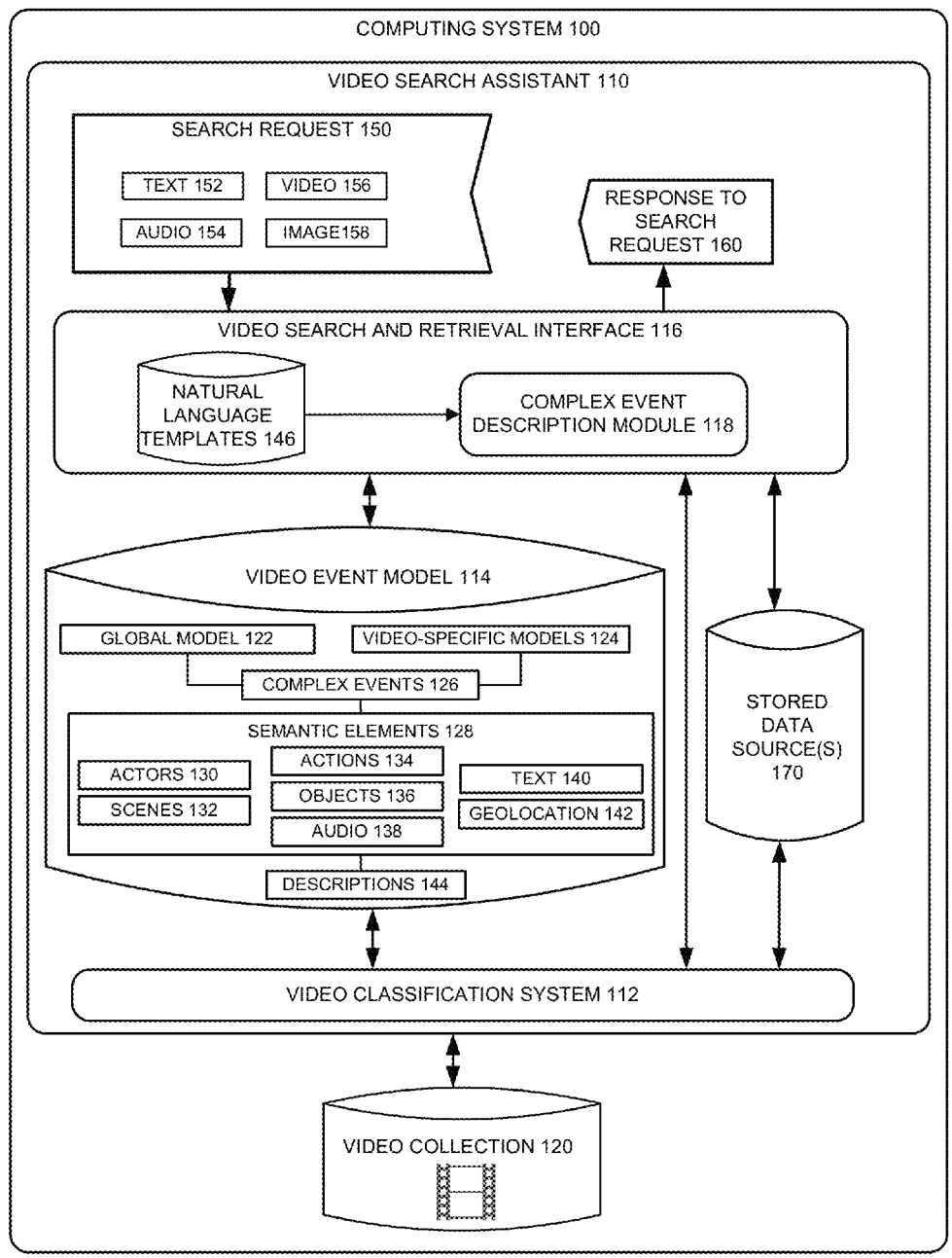
FIG. 1 is a simplified module diagram of at least one embodiment of a video search assistant.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Some existing techniques for recognizing features depicted in videos can detect the occurrence of simple, "atomic" actions, such as "person walking," "kissing," "placing an object," etc. This type of automated tagging may be somewhat helpful for certain applications (such as surveillance or intelligence analysis, perhaps). However, such techniques require the use of a large number of example training videos, which may not be available in, for example, consumer-oriented contexts. Additionally, these tags are too primitive to be used for the typical Internet video search or similar types of interactive searches. Particularly in consumer-oriented settings, users are rarely looking to retrieve videos of simple actions like "person walking" Rather, search terms that refer to more complex events, such as "wedding," "birthday party," "fishing trip," and the like, are more common.

Figure 9:
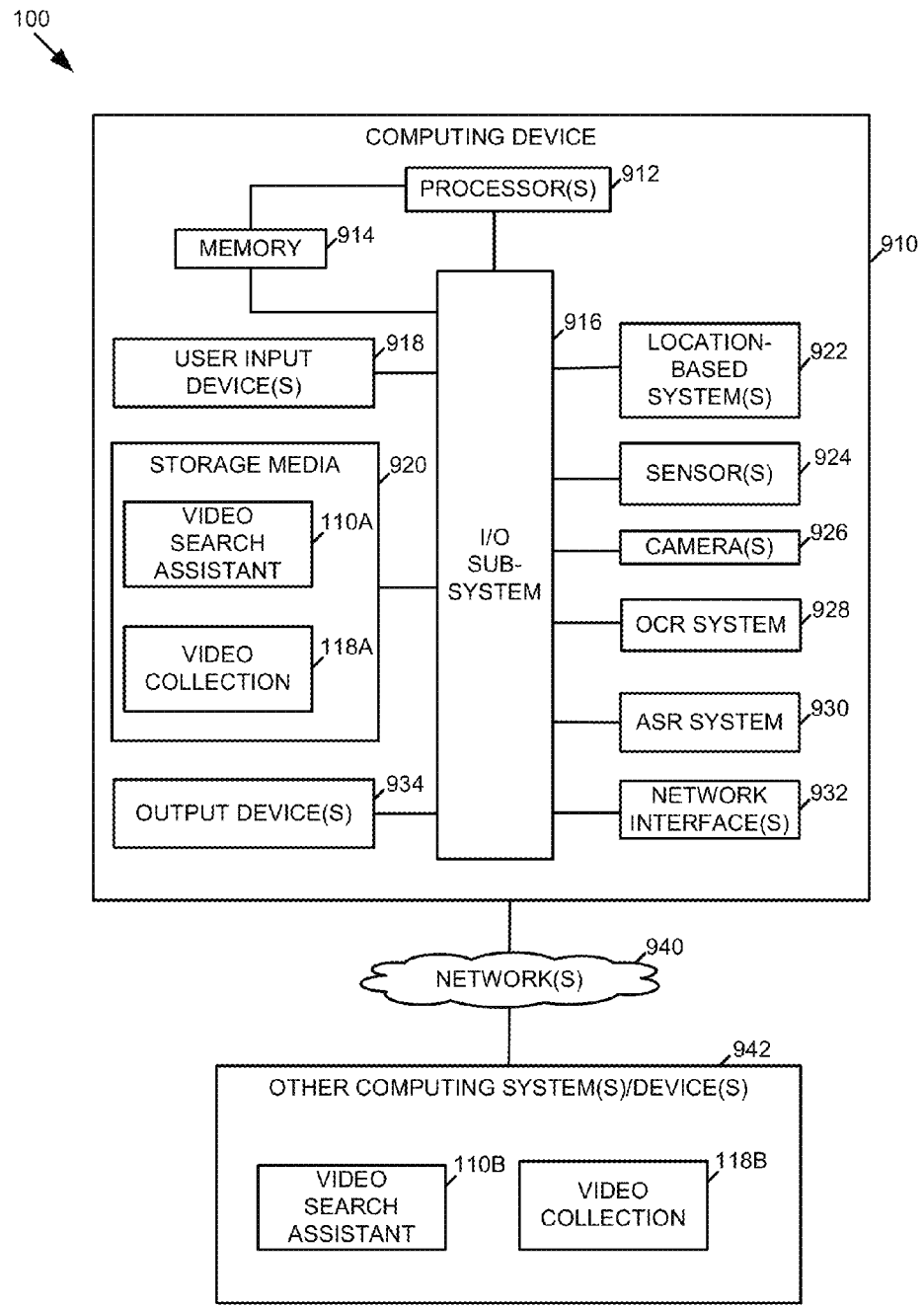
FIG. 9 is a simplified block diagram of an exemplary computing environment in connection with which at least one embodiment of the video search assistant of FIG. 1 may be implemented.

Referring to FIG. 1, a video search assistant 110 is embodied in a computing system 100, an example of which is shown in FIG. 9, described below. The video search assistant 110 can assist users with the classification, searching, and/or retrieval of videos that may be stored, for example, in a video collection 120. The illustrative video search assistant 110 is embodied as a number of computerized modules and data structures including a video classification system 112, a video event model 114, and a video search and retrieval interface 116. As described in more detail below, the video classification system 112 can develop and use the video event model 114 to identify complex events that likely are depicted in videos and classify the videos according to those complex events.

The video search and retrieval interface 116 can use the video event model 114 to facilitate video searching and retrieval based on complex events. For example, in some embodiments, a complex event description module 118 may prepare human-intelligible representations or descriptions 144 of complex events depicted in videos. These representations or descriptions 144 can be useful to formulate a video search, to enhance the presentation of search results, or for other purposes. In some embodiments, the complex event description module 118 may apply one or more natural language templates 146 to produce the representations or descriptions 144 in a natural language form (e.g., an essay- or dialog-like format), or to produce non-textual visual and/or audio representations of the natural language descriptions of the various semantic elements. For example, the natural language templates 146 may specify introductory or closing phrases (e.g., "I found," "This is," "What do you think?" etc.), transitional words or phrases (e.g., "in," "followed by," etc.), and/or other verbiage to be inserted in the complex event description. Whether presented in audio or visual form, such descriptions can be used to engage the user in a dialog about a desired video search, to refine a previously-executed search, or to modify the presentation of search results, for example.

By "complex event," we mean, generally, complex visual happenings, such as life events and how-to demonstrations. Complex events are characterized by a combination of different atomic events and/or other detected elements, such as scenes, actors (e.g., people or other living things), objects, audio, or text. Whereas atomic elements tend to be temporally localized, complex events relate to a number of different atomic elements or "concepts" that may be juxtaposed (e.g., they may occur together, either in the same frame or in a sequence of frames of the video), may occur in a temporal sequence over the course of the video, or may occur in different temporal segments of the video, for instance. Some examples of complex events include events that involve an actor or multiple different actors interacting with other people, objects, or living things (e.g., a concert, a baseball game, a dog show, a trip to the zoo, a birthday party, or a dance recital). As an example, a "wedding ceremony" may consist of various atomic actions such as "hugging" and "kissing," which may occur together or at different times during a video. If, in a given video, "hugging" is detected as occurring in a church-like setting or a garden scene, objects such as a "ring" and "candles" are detected, and traditional wedding music is detected in the audio track, the video likely may depict a wedding ceremony. If, however, the "hugging" is detected as occurring along with "people jumping," an object such as a "ball" is detected, and a large cheering crowd is detected in the audio track, the video more likely may depict a team winning a sporting event rather than a wedding ceremony. By using intelligent, automated complex event detection and classification techniques, the video search assistant 110 can, without needing to refer to manually-added tags, distinguish between different types of complex events even if they contain some of the same atomic events or elements, and classify videos according to the complex event(s) that are most likely depicted therein.

References herein to a "video" may, in various embodiments, refer to a relatively short video clip, an entire full-length video production, to different segments within a video or video clip, or to different spatio-temporal regions of interest within a video segment. In processing a video, the video classification system 112 interfaces with the video event model 114 to determine the most appropriate complex event classification for the video (or portion thereof, as the case may be) and updates the video event model 114 with information about the newly classified video. In some cases, the video classification system 112 may interface with one or more stored data sources 170 to obtain information that may aid the classification process. Such data sources 170 may include, for example, private, semi-private, and/or public dictionaries, references, or ontologies, and may include Internet-based services such as WIKIPEDIA, WORDNET, DICTIONARY.COM, and/or others. As videos are classified by the system 112, information obtained from the stored data sources 170 may be incorporated into the video event model 114.

The video classification system 112 may initiate processing of a video in a number of different ways. For example, classification of a video may be automatically triggered by the storing of the video in memory, by the uploading of the video to a networked storage location (such as an Internet-based video repository), or by the expiration of a defined time period (e.g., by a computer application setting that causes a video repository to be scanned periodically to classify newly added videos). In other cases, the video classification system 112 may be initiated by a user in connection with a video search or through the use of an interactive video indexing application, for instance.

The video search and retrieval interface 116 provides a gateway through which the video event model 114 can be used to provide more sophisticated video search and retrieval functionality in response to user-initiated search requests 150. The search requests 150 may take a number of different forms, including one or more textual elements, non-textual visual elements, and/or audio elements. As such, the search requests 150 may include text 152 (e.g., one or more search terms), audio 154, video 156, images 158, or a combination of any of these. The search requests 150 may be input to the computing system 100 using the requisite input/output device(s), some examples of which are mentioned below with reference to FIG. 9. For instance, an audio search request 154 may be initiated by a user through a spoken natural language interface of the computing system 100 or by the user selecting an audio clip on a display screen of the computing system 100. The video search and retrieval interface 116 may access the video event model 114, determine that further clarification of the audio request 154 is needed, and present a response 160 to the request 154. The user may refine the search request 154 by providing additional audio 154, entering text 152 into a dialog box, selecting check boxes associated with search terms suggested by the interface 116 after consultation with the video event model 114, or through other suitable user interface mechanisms. Alternatively or in addition, the user may initiate or refine a video search by identifying a non-textual visual element such as a video 156 or an image 158 as the basis of the search request 150 (e.g., "find videos that are like this one" or "find videos containing this image"). In some embodiments, the video search and retrieval interface 116 may engage portions of the video classification system 112 to classify the video 156 or image 158 prior to formulating a search. The video event model 114 may be updated based on user feedback at any stage.

The illustrative video event model 114 is embodied as one or more computer-accessible data and/or programming structures (e.g., vectors, matrices, databases, lookup tables, or the like), and may include one or more indexed or otherwise searchable stores of information. The video event model 114 may contain or reference data, arguments, parameters, and/or machine-executable algorithms that can be applied to a video being classified by the video classification system 112 or to a search request 150 being handled by the video search and retrieval interface 116.

The video event model 114 contains a global model 122 and video-specific models 124. The global model 122 includes, at a general level that can be applied to a variety of different types of videos, semantic information about various types of complex events 126 and atomic elements or "concepts" 128 associated therewith. Illustratively, the semantic elements 128 include semantic descriptions of actors 130 (e.g., persons or other living things), scenes 132, actions 134, objects 136, audio 138, text 140, and geographic location 142. The global model 122 also maintains indicators of the determined evidentiary significance of each of the semantic elements 128 to the various types of complex events 126. In some embodiments, these indicators are gleaned by the video classification system 112 using machine learning techniques based on a number of training videos depicting the various types of complex events 126. For example, training videos depicting a "person making a sandwich" (a complex event) may indicate that semantic elements such as "kitchen" (scene), "hands visible" (actor), "placing fillings on bread" (action) and "spreading creamy substance" (action) are highly likely to be associated with a person making a sandwich, while other atomic elements such as "outdoor event," (scene), "vehicle moving" (action) or "person jumping" (action) are unlikely to be associated with that particular complex event. Alternatively or in addition, one or more of these indicators may be developed based on information that is manually supplied to the video search assistant 110. For instance, a person viewing a video of someone making a sandwich may conclude that "slicing bread" (action) is an atomic element that is highly likely to indicate a person making a sandwich, and as a result, add that indicator to the video event model 114 manually.

Whereas the global model 122 semantically describes types and categories of complex events and atomic elements or "concepts" that may be detected in videos generally, the video-specific models 124 contain information relating to the actual instances or occurrences of the various complex events 126 and the semantic elements 128 that are associated with those complex events, in the videos that have been processed by the video classification system 112. That is, for a given video that has been classified by the system 112, the video-specific model 124 contains information about instances of semantic elements 128 detected in the video by type (e.g., actors 130, scenes 132, actions 134, objects 136, audio 138, text 140, and geographic location 142) and information about each complex event 126 detected in the video. Further, the video-specific model 124 maps the complex event and semantic element information to the location(s) in the video at which they occur (e.g., frame number). In some embodiments, a video-specific model 124 may indicate whether a semantic element is present or absent in a video in discrete manner (e.g., 1=present, 0=absent), while in other embodiments, an evidentiary value defined with reference to a range of possible values (e.g., a probabilistic or statistical likelihood or confidence) may be assigned. In some embodiments, portions of the video-specific model 124 may be stored with the video in the video collection 120 (e.g., as meta tags or annotations).

In some embodiments, the video event model 114 includes or references ontological information, which may indicate relationships between words and phrases that are commonly used by people to describe the various complex events 126 and semantic elements 128 that are depicted in the videos. For instance, whereas the video classification system 112 may be programmed to recognize an action as "slicing bread," a person manually tagging the same video may use the phrase "cutting a slice of bread." Accordingly, the video event model 114 may include an indication that these two phrases are semantically similar. As such, the video event model 114 may include semantic information that describes the meanings of different words and phrases that may be associated with the complex events 126 and/or the semantic elements 128, their properties, and the relationships between or among the different complex events 126 and semantic elements 128 represented in the model. In some embodiments, the video event model 114 is updated continuously as new videos are analyzed, as new searches are performed, as new complex events are learned, and/or as new user feedback is received.

The video collection 120 refers generally to one or more bodies of retrievable multimedia digital content that may be stored at the computing system 100 and/or other computing systems or devices. The video collection 120 may include videos stored remotely at Internet video sites such as YOUTUBE and/or videos that are stored in one or more local collections, such as storage media of a personal computer or mobile device (e.g., a "camera roll" of a mobile device camera application). In any case, videos in the video collection 120 need not have been previously tagged with meta data or other identifying material in order to be classified by the video classification system 112. More generally, the video search assistant 110 can operate on videos whether or not they have been previously tagged or annotated in any way.

Figure 2:
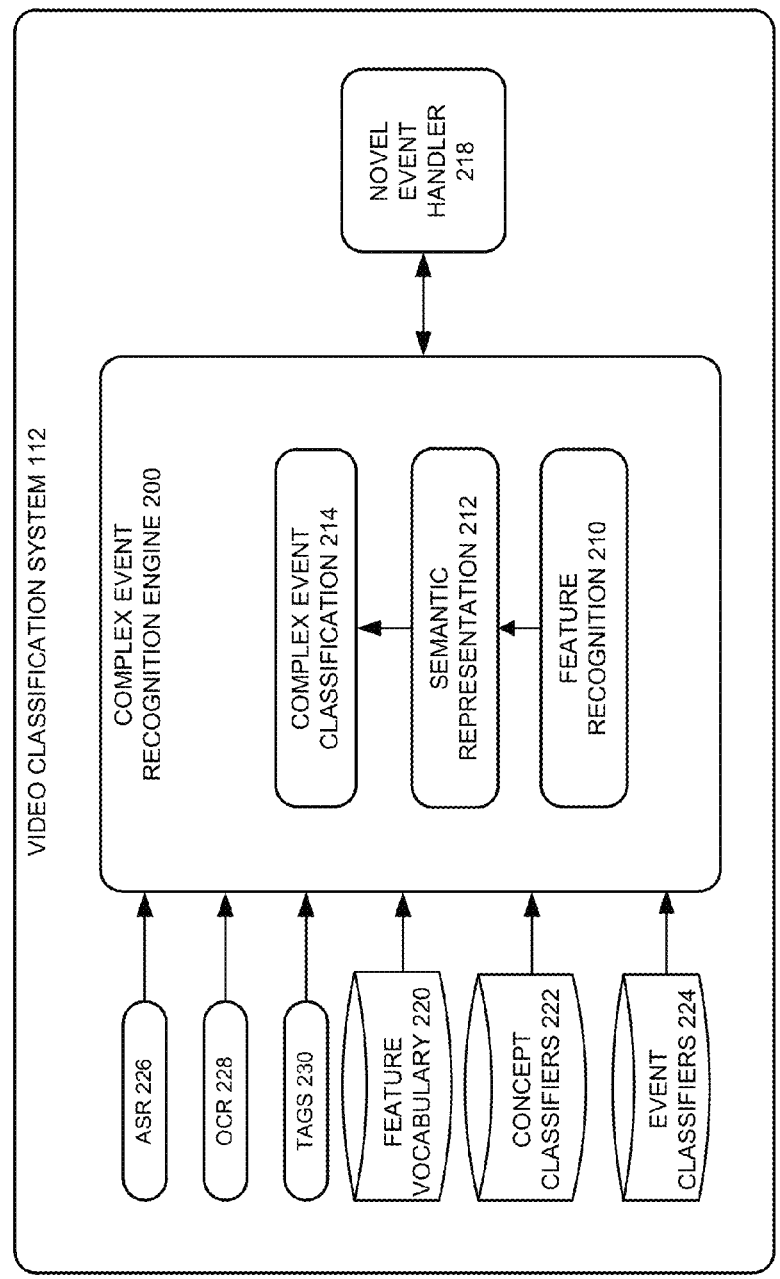
FIG. 2 is a simplified module diagram of at least one embodiment of the video classification system of the video search assistant of FIG. 1.

Referring now to FIG. 2, the video classification system 112 is shown in greater detail. The illustrative video classification system 112 includes a complex event recognition engine 200, which recognizes complex events based on lower-level features that have been detected in the videos, and a novel event handler 218, which can recognize new complex events (e.g., complex events that were previously undefined in the video event model 114) without having to perform lower-level feature recognition.

The illustrative complex event recognition engine 200 is embodied as a feature recognition module 210, a semantic representation module 212, and a complex event classification module 214. The feature recognition module 210 employs a number of automated feature recognition algorithms to detect lower-level features of interest in the video, and engages a feature vocabulary 220 to recognize the low-level features. By "low-level," we mean, generally, visual features that capture characteristic shapes and motion without significant spatio-temporal variations between different instances of the features. In some embodiments, both static and dynamic low-level visual features are used. Static visual features include features that are extracted from individual keyframes of a video at a defined extraction rate (e.g., 1 frame/second). Some examples of static visual feature detectors include Gist, SIFT (Scale-Invariant Feature Transform), and colorSIFT. The Gist feature detector can be used to detect abstract scene and layout information, including perceptual dimensions such as naturalness, openness, roughness, etc. The SIFT feature detector can be used to detect the appearance of an image at particular interest points without regard to image scale, rotation, level of illumination, noise, and minor changes in viewpoint. The colorSIFT feature detector extends the SIFT feature detector to include color keypoints and color descriptors, such as intensity, shadow, and shading effects.

Dynamic visual features include features that are computed over x-y-t segments or windows of the video. Dynamic feature detectors can detect the appearance of actors, objects and scenes as well as their motion information. Some examples of dynamic feature detectors include MoSIFT, STIP (Spatio-Temporal Interest Point), DTF-HOG (Dense Trajectory based Histograms of Oriented Gradients), and DTF-MBH (Dense-Trajectory based Motion Boundary Histogram). The MoSIFT feature detector extends the SIFT feature detector to the time dimension and can collect both local appearance and local motion information, and identify interest points in the video that contain at least a minimal amount of movement. The STIP feature detector computes a spatio-temporal second-moment matrix at each video point using independent spatial and temporal scale values, a separable Gaussian smoothing function, and space-time gradients. The DTF-HoG feature detector tracks two-dimensional interest points over time rather than three-dimensional interest points in the x-y-t domain, by sampling and tracking feature points on a dense grid and extracting the dense trajectories. The HoGs are computed along the dense trajectories to eliminate the effects of camera motion (which may be particularly important in the context of unconstrained or "in the wild" videos). The DTF-MBH feature detector applies the MBH descriptors to the dense trajectories to capture object motion information. The MBH descriptors represent the gradient of optical flow rather than the optical flow itself. Thus, the MBH descriptors can suppress the effects of camera motion, as well. However, HoF (histograms of optical flow) may be used, alternatively or in addition, in some embodiments. Additional details of the illustrative low-level feature detectors can be found in U.S. Provisional Patent Application Ser. No. 61/637,196.

The feature recognition module 210 quantizes the extracted low-level features by feature type using a feature-specific vocabulary 220. In some embodiments, the feature vocabulary 220 or portions thereof are machine-learned using, e.g., k-means clustering techniques. In some cases, the feature vocabulary 220 may include a smaller vocabulary size (e.g., 1000 words) for static features and a larger vocabulary (e.g., 10,000 words) for dynamic (e.g., motion) features. The feature recognition module 210 aggregates the quantized low-level features by feature type, by using, for example, a Bag-of-Words (BoW) model in which a frequency histogram of visual words is computed over the entire video.

In some embodiments, the semantic representation module 212 applies event classifiers 224, such as Support Vector Machine (SVM) classifiers, directly to the BoW features, and the complex event classification module 214 uses various data fusion strategies (e.g., early and late fusion) to identify complex events 126 based on the fused low-level features. In other embodiments, the semantic representation module 212 performs concept detection based on the low-level features and the complex event classification module 214 determines the complex events based on the detected concepts. More specifically, the illustrative semantic representation module 212 uses one or more concept classifiers 222 to analyze the low-level features and derive therefrom the semantic elements 128, which represent the higher-level concepts or atomic elements including scenes, actions, actors, and objects, as described above. The complex event classification module 214 applies one or more of the event classifiers 224 to the semantic elements 128 to determine the complex events 126 that are likely associated with the detected semantic elements 128. The concept classifiers 222 and/or event classifiers 224 may be manually specified and/or derived using machine learning techniques, in various embodiments of the video classification system 112. Additional details of one exemplary algorithm for concept-based complex event recognition are described below with reference to FIG. 3.

Some embodiments of the video classification system 112 can detect the presence of a variety of different types of atomic elements in videos, including audio 138, text 140, and geographic location 142, in addition to the more typical visual features (e.g., actors, objects, scenes, actions). To do this, the illustrative complex event recognition engine 200 interfaces with an automated speech recognition (ASR) system 226, an optical character recognition (OCR) system 228, and/or pre-existing tags 230. For instance, the ASR system 226 may identify spoken words present in a video's audio track and provide a text translation of the spoken words to the complex event recognition engine 200. The OCR system 228 may recognize text that is present in a visual scene of the video and provide the recognized text to the complex event recognition engine 200. For example, the OCR system 228 may be used to detect words or phrases displayed on apparel, street signs, or buildings that are depicted in the video. The tags 230 may provide additional information about the video to the complex recognition engine 200. The tags 230 include meta tags, annotations, or the like, which may have been manually supplied or automatically associated with the video, e.g., by a video camera application of a computing device. For instance, some mobile computing devices are equipped with an integrated geolocation system (such as a Global Positioning System or GPS) and/or other sensors that can detect geographic location, motion, and/or other real-time sensed information. Video camera applications for such devices may access the GPS data (or other real-time data) and automatically associate it with a video at the time the video is created. Other methods of obtaining geographic location information about scenes and events depicted in videos may be used, alternatively or in addition. Some examples of such methods are described in Cheng et al., U.S. patent application Ser. No. 13/493,654, filed Jun. 11, 2012. Data fusion techniques are used by the complex event recognition engine 200 to combine these "alternative" visual and non-visual features with the more traditional visual features produced by the feature recognition module 210. In this way, the complex event recognition engine 200 can utilize a variety of visual and non-visual features to identify complex video events.

The illustrative video event model 114 is initially developed based on training videos, e.g., videos that are known to depict certain events. As new videos are classified by the complex event recognition engine 200, the video event model 114 is updated, either manually or through machine learning techniques. Some videos may depict events with which the video event model 114 is not already familiar (e.g., events for which there are no training examples recognized in the video event model 114). These events may be referred to as "novel events." The novel event handler 218 can classify novel events based on a semantic description of the event, rather than requiring the video to undergo the processing performed by the complex event recognition engine 200 described above or otherwise to explicitly define the event. Such a description may be supplied by a user, in the form of annotations or tags, or even a manually defined concept vector (concept vectors and semantic concept spaces are described further below, with reference to FIG. 3). As a simple example, a semantic concept space may include a number of dimensions each representing pre-defined concepts that tend to be indicators of different types of complex events, e.g.: [indoor event, outdoor event, kitchen, person kissing, vehicle moving, hands visible, placing fillings on bread, spreading cream, jumping over obstacles, person pointing]. Based on a viewing of a video depicting "making a sandwich," a corresponding concept vector may be estimated based on human knowledge as follows: [1, 0, 1, 0, 0, 1, 1, 1, 0, 0], where each binary value indicates the presence or absence of the concept dimension in the video (1=present, 0=absent). In some embodiments, these binary values may be enhanced by computing the semantic similarity between pairs of concepts. For example, the atomic action "dancing" may or may not be an indicator of a "wedding ceremony" (e.g., depending on the type of ceremony). Therefore, assigning a binary indicator may be too restrictive. In this case, the binary setting may be modified or determined based on the semantic similarity of "dancing" to other co-occurring concepts.

The concept vector for the novel event may be defined by a user, or generated by the novel event handler 218 based on information supplied by a user (e.g., meta tags) or information obtained from a stored data source 170. As an example, a user may create a video of a fishing trip and give it the title, "fishing trip." With this information, the novel event handler 218 may consult a data source 170 to identify concepts that are commonly associated with fishing trips, and then generate a concept vector for the video based on that information. With the semantic description of the novel event represented as a concept vector in the semantic concept space, the novel event handler 218 can determine whether a video depicts a particular complex event by computing the semantic similarity or semantic affinity of dimensions of the video's concept vector to the semantic elements in the concept space. To do this, a semantic affinity matrix of concepts derived from data sources 170 such as WORDNET and WIKIPEDIA, or computed from video training examples, may be used. Some examples of techniques for computing semantic affinity are discussed in U.S. Provisional Patent Application Ser. No. 61/637,196.

Figure 3:
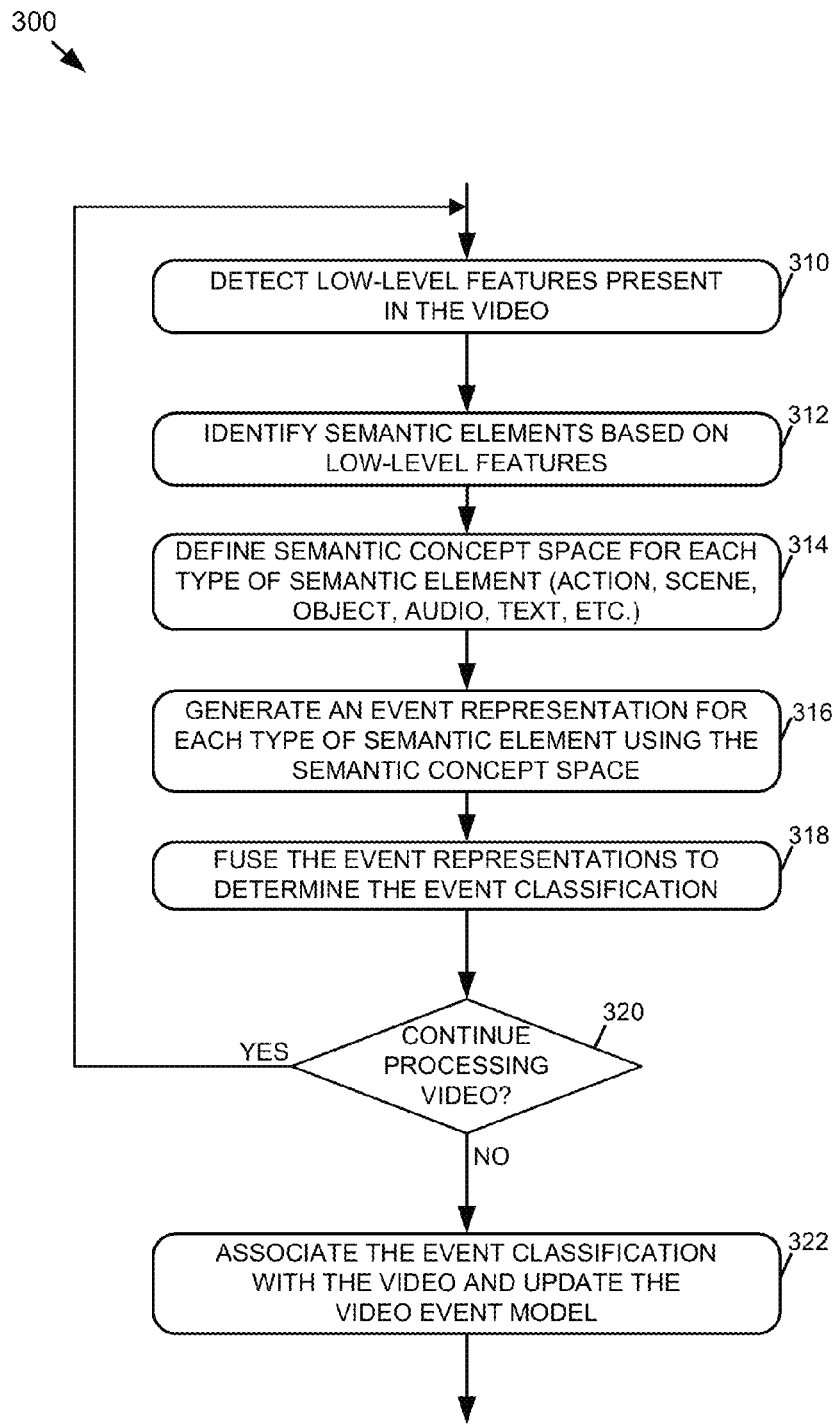
FIG. 3 is a simplified flow diagram of at least one embodiment of a method by which the video search assistant of FIG. 1 may classify a video depicting one or more complex events.

Referring now to FIG. 3, an illustrative method 300 for recognizing and classifying a video depicting a complex event, which may be embodied as computerized programs, routines, logic and/or instructions of the video classification system 112 and/or other components of the video search assistant 110, is shown. At block 310, the method 300 detects the low-level features of interest that are present in the video using, for example one or more of the static and dynamic feature detectors mentioned above. In some embodiments, the method 300 may aggregate the low-level features according to feature type using, e.g., BoW representations. Further, in some embodiments, the aggregated features may be combined using one or more data fusion techniques as described above.

At block 312, the method 300 applies concept detectors to the low-level features to identify the atomic, concept-level semantic elements (e.g., actions, scenes, objects, actors, audio, text) associated with the low-level features. In some embodiments, static features, dynamic features, and BoW representations defined over codebooks of these features are used as inputs to the concept detectors. Concept classifiers 222 (e.g., binary SVM classifiers) may used to classify the features according to their concept type. A concept detector is defined or selected for each concept type (suitable concept detectors are publicly available) and applied to the features associated with the concept type. For example, an action concept detector might determine whether a video feature likely depicts an "animal eating" or a "person dancing," while a scene concept detector may determine whether the video feature likely depicts a "church" or a "kitchen" and an object concept detector may determine whether the video feature likely depicts a "wheel" or "food."

Generally speaking, a concept detector takes an input x, applies a concept detection algorithm to x, and outputs a detection confidence indicating the likelihood that x depicts the concept that the concept detector is designed to detect. In the case of concept detectors that detect actions, the input x is a short segment of the video. For concept detectors that detect scenes, objects, or actors, the input x is a keyframe or a series of keyframes sampled from the video. As complex events may include multiple concepts depicted in the same keyframes or video segments, multiple different types of concept detectors may be applied to the same input x.

Figure 6:
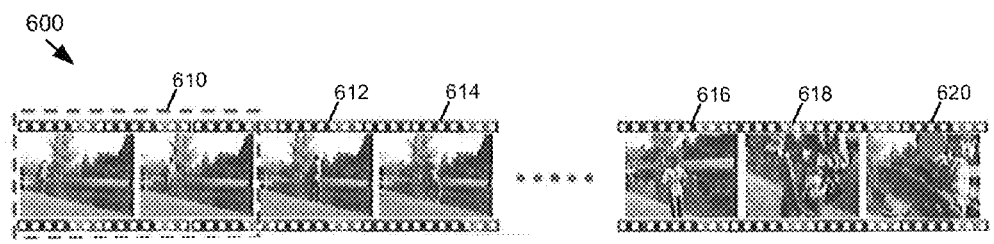
FIG. 6 is an example of a video in which a moving window is used by the video search assistant of FIG. 1 to classify the video.

As an example, FIG. 6 illustrates a video 600 to which a moving x-y-t window 610 is applied and from which keyframes 612, 614, 616, 618, 620 are sampled. The moving window 610 involves multiple frames of the video. The low-level features detected in these frames are analyzed in order to detect motion occurring in the video. In this example, an analysis of the moving window 610 over the duration of the video 600 may detect motion of a person's arms and legs. An action concept detector may conclude that such motion likely corresponds to a person casting or reeling a fishing rod. Each of the sampled keyframes 612, 614, 616, 618, 620 may be analyzed to detect the presence of low-level features that are indicators of, e.g., scenes, objects, or actors. For instance, scene concept detectors may determine that the keyframes 612, 614, and 616 depict sky, grass, a body of water, and a person standing near the body of water. An object concept detector may determine that the keyframes 616, 618, 620 depict a fish, and an actor concept detector may determine that the keyframe 620 depicts a person's face (occluded in the drawing, for privacy).

At block 314, a semantic concept space is defined for each type of semantic element, in which each dimension of the concept space encodes the value of a semantic property. In some embodiments, the semantic concept space may be represented as a K×W matrix, where K is the number of concept detectors and W is the number of video inputs x taken from the video (where x is a keyframe or a sliding window, depending on the concept type). That is, each row of the matrix corresponds to a concept detector and each column of the matrix corresponds to an input x from the video. Thus, a semantic concept space for "action" concept types may include rows corresponding to "person walking," "person reeling," "person casting," etc., and each column may correspond to a different sliding window of the video. Similarly, a semantic concept space for "scene" concept types may include rows corresponding to "outdoor event," "body of water," etc., and each column may correspond to a different sampled keyframe of the video. Likewise, a semantic concept space for "object" concept types may include rows corresponding to "fish" and "fishing pole" and each column may correspond to a different sampled keyframe of the video.

To embed a video input x into the K-dimensional concept space, a set of functions operates on the video input x to assign a value or "detection score" to the input x indicating the confidence that each concept is depicted in the input x. In other words, the confidence value is a representation of the similarity of content depicted in the input x to the given concept. The confidence may be represented as a binary value, e.g., 0 or 1, or otherwise (e.g., as a probability or statistical likelihood). The confidence value may correspond to the output of the concept detectors, in some cases. In other cases, where sliding windows are evaluated over the course of the entire video, for example, the confidence value may represent an aggregation of the concept detector outputs across all sliding windows (using, e.g., a max function).

At block 316, the method 300 uses the semantic concept space to generate an event representation for each type of semantic element. That is, for each concept type (e.g., action, scene, object, actor, etc.), the method analyzes the concept vectors in the semantic concept space to determine the complex event most likely represented by the semantic elements. For example, a concept space for "action" concepts may include confidence values for a number of different types of atomic actions, some of which tend to be indicators of certain complex events and others that do not. The event representation may be determined in a number of different ways, ranging from counting the occurrences of various concepts to calculating statistical concept confidences, co-occurrences, and co-occurrence strengths of the confidences. For instance, a max concept detection score (Max), statistics of concept score (SCS), Bag of Concepts (BoC), Co-occurrence Matrix (CoMat), and/or Max Outer Product (MOP) method may be used. The Max method selects the maximum detection score over all sliding windows represented in the concept space. The SCS method generates a distribution of the scores to model a specific event by computing the maximum, average, and standard deviation of the concept detection scores. The BoC method generates a histogram representing the frequency of occurrence of each concept over the entire video clip. The CoMat method generates a histogram of pairwise co-occurrences, which is used to represent the pairwise presence of concepts independently of their temporal distance from one another in the video clip. The MOP method takes the outer product of the Max value of each concept across the entire video and thus represents both the strength of the presence of each concept as well as the strength of co-occurrence of pairwise concepts. In some embodiments, an event classifier (e.g., an SVM classifier) may be trained on each type of event representation. Additional details relating to these techniques can be found in U.S. Provisional Patent Application Ser. No. 61/637,196.

At block 318, the event representations for each concept type are fused using one or more of the data fusion techniques mentioned above to make a final determination of the complex event classification factoring in all of the concept types. As an example, video clips of a wedding ceremony and a sports team winning a contest may have some similarities in their respective action concept spaces (e.g., "hugging," "dancing") but have very different object and scene concept spaces (e.g., "candles" vs. "ball" and "church" vs. "arena"). Thus, when all of the event representations are considered together, a more accurate determination of the complex event depicted in the video likely can be obtained.

At block 320, the method 300 determines whether the processing of the video is complete, or whether additional processing is needed. For instance, in some embodiments, the foregoing blocks 310, 312, 314, 316, 318 may be performed over the entire video or to predefined segments of the video, individually. In the case where individual segments are separately processed (as may be the case for lengthy videos), block 320 determines whether any additional video segments remain to be processed. If so, the method 300 returns to block 310 and continues with the processing of the next segment in the video. If not, the method proceeds to block 322.

At block 322, the method 300 associates the complex event classification determined at block 318 with the video and updates the video event model 114 to include the complex event and semantic element information associated with the video. Such information may be stored in a video-specific model 124. Alternatively or in addition, the complex event and/or semantic elements may be attached to or linked with the video (e.g., as meta tags or annotations) and stored with the video in the video collection 120. In some embodiments, the video event model 114 may be updated after block 318, e.g., after the processing of each video segment, alternatively or in addition to the updating that occurs at block 322.

Figure 4:
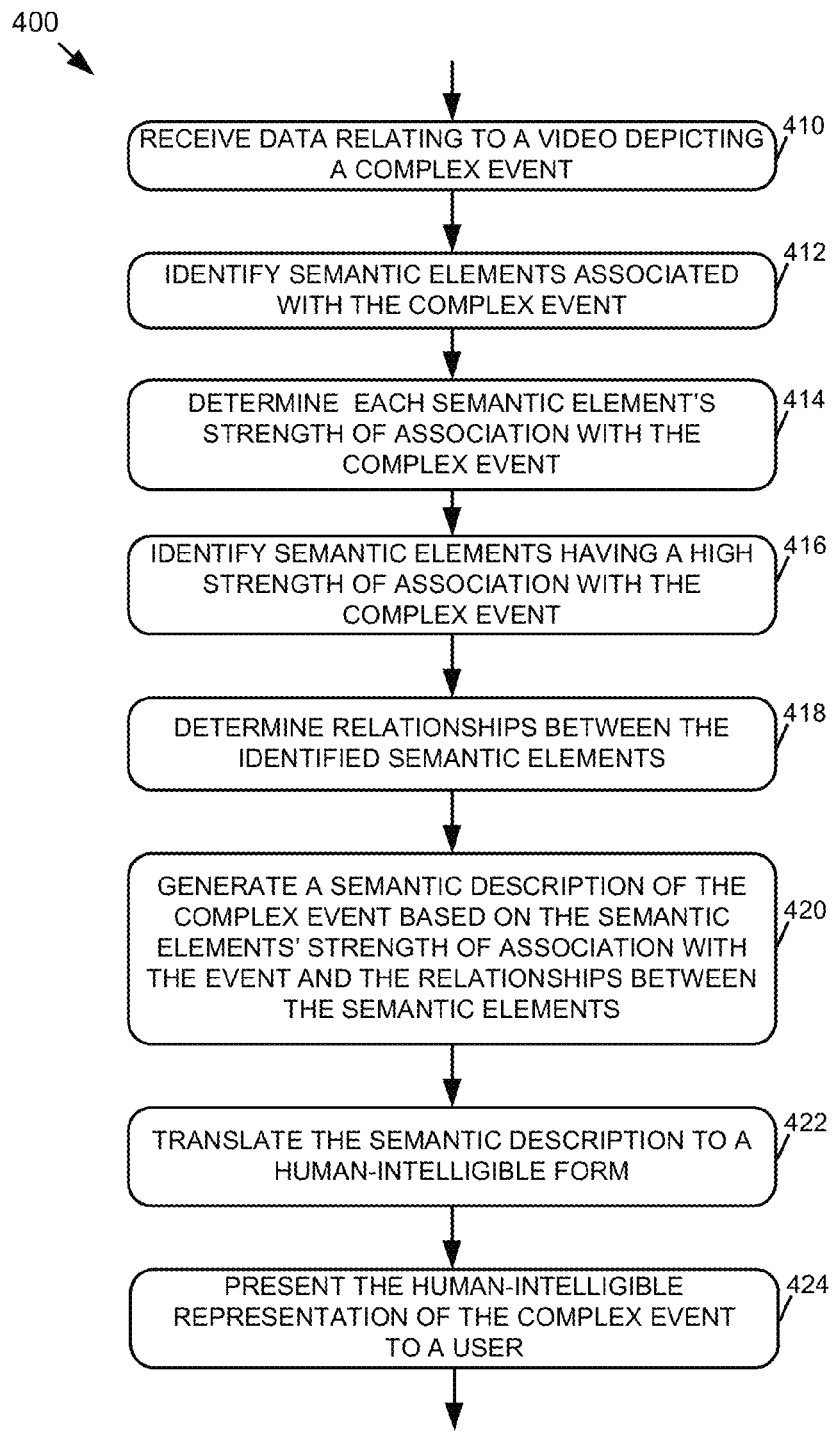
FIG. 4 is a simplified flow diagram of at least one embodiment of a method by which the system of FIG. 1 may generate a human-intelligible representation of a video depicting a complex event.

Referring now to FIG. 4, an illustrative method 400 for generating a human-intelligible description or representation of a complex event depicted by a video, which may be embodied as computerized programs, routines, logic and/or instructions of the complex event description module 118 and/or one or more of the various modules of the video search assistant 110, is shown. Videos often contain a large amount of irrelevant information or details in addition to events and elements that are of interest for determining a complex event depicted therein. The complex event classification techniques described herein are designed to distinguish between concept-level (action, scene, object, actor, etc.) features that are important to a complex event determination and those that are not. Accordingly, when a video is classified by the video classification system 112 as likely depicting a complex event, the video event model 114 will include information about the semantic elements used to make that classification. Moreover, as described herein, such information is based on higher-level "concept" features that are easier for users to understand and more useful for common searching. The process of determining the evidentiary details that support the detection of an occurrence of a complex event in a video (e.g., the details that answer the question, "why does this video contain the complex event?") may be referred to as "recounting." The method 400 applies recounting techniques to the higher-level, "concept" features associated with a complex event. Further, the method 400 prepares a human-intelligible description or representation of the complex event. Aspects of the "raw" recounting and/or the human-intelligible description or representation of the complex event can be used to facilitate video searching and retrieval or for other purposes. In fact, a recounting of the complex event is more likely to be suitable for video search and retrieval purposes than a simple listing of atomic actions or elements (e.g., simple primitives like "walking," "placing an object," etc.), since users often prefer to conduct searches for semantically meaningful complex events rather than simple actions. Additional details of some exemplary techniques for recounting complex video events in accordance with this disclosure are described in Yu, et al., *Multimedia Event Recounting with Concept based Representation*, presented at the Association of Computing Machinery (ACM) Multimedia Conference, Nov. 4, 2012, which is incorporated herein by this reference in its entirety.

At block 410, the method 400 receives data relating to a video that has been classified as depicting a complex event (e.g., by the video classification system 112 or in some other way). Such data may include, for example, the file name or title of a video retrieved as a result of a search for videos depicting the complex event. In some embodiments, the data may include non-textual visual elements (e.g., video segments or images) and/or audio elements, alternatively or in addition to textual elements. In any case, the video in question has been identified (e.g., by the video classification system 112) as having a positive confidence score in relation to the complex event of interest. Based on this information, the method 400 may consult a video specific model 124 corresponding to the retrieved video.

At block 412, the method 400 identifies the semantic elements associated with the complex event depicted in the video. The relevant semantic elements may be determined by accessing a video-specific model 124 that associates the video with the complex event. In other words, the video's complex event classification is used to determine the associated semantic elements. As noted above, the semantic elements represent "concepts" such as actions, scenes, audio, objects, actors, etc., which are more descriptive and meaningful than lower-level features or atomic elements. That is, if a semantic concept space is defined using a collection of pre-selected concepts of various concept types (action, audio, scene, actor, object, etc.), the video's complex event classification can be derived from the dimensions of the concept space, each of which represents the evidentiary value of a semantic element to the complex event determination. As discussed above, the video's ultimate complex event classification may be based on a global additive classifier, such as a Support Vector Machine (SVM) decision function, which is applied to the concept vectors.

At block 414, the method 400 determines the strength of association of each of the semantic elements with the complex event. To do so, the method 400 may mathematically decompose the global classifier to obtain decision values for each semantic element. These decision values represent a determination of how much the semantic element contributes to the final decision value, e.g., the single complex event confidence value. An example of a process for decomposing an additive classifier is shown in U.S. Provisional Patent Application Ser. No. 61/637,196.

At block 416, the method 400 identifies semantic elements that have a high strength of association with the complex event. To do this, the method 400 may sort the feature-specific decision values obtained from the decomposed classifier according to their importance and select the semantic elements having the highest decision values, for example. At block 418, the method 400 determines the temporal, spatial, causal, or other relationships between the semantic elements identified at block 416 as having a high degree of importance to the complex event determination. To do this, the method 400 may utilize the co-occurrence techniques described above, which capture the temporal relationships between semantic elements (e.g., whether one element is followed by another element, temporally, in the video). Spatial, causal, and/or other types of relationships between or among the semantic elements may be determined using these or similar techniques and/or other suitable methods.

At block 420, the method 400 generates a semantic description of the complex event. In the illustrative embodiments, the semantic elements are presented according to their determined degree of importance to the complex event determination and based on their spatial, temporal, causal, or other relationships to one another, as determined at blocks 416 and 418, respectively. In doing so, the illustrative method 400 omits any semantic elements that do not evidence the complex event. As such, the semantic description tends to convey the important or most relevant features that contribute to the complex event decision (e.g., those features that caused the video to be retrieved as depicting the complex event), rather than transcribing the entire video content. The semantic description may include, for example, a listing of the semantic elements in their order of importance. It should be understood, however, that semantic elements of lesser importance to the complex event may be included in the semantic description, in some embodiments. For instance, in some cases, it may be desirable to know which semantic elements the system considers as being of lesser evidentiary importance to the complex event determination.

At block 422, the method 400 translates the semantic description to a human-intelligible form, e.g., visual and/or audio elements (e.g., words, phrases, images, etc.) that describe the complex event and the concept-level features detected in the video that evidence the complex event. In some embodiments, the human-intelligible form may include a tabular or graphical representation of the semantic description, other types of visual elements (e.g., video stills, thumbnail images of evidentiary frames, etc.) and/or audio elements (e.g., clips of music or speech from the video's audio track), alone or in combination with other human-intelligible elements. In some embodiments, the natural language templates 146 may be used to combine natural language forms of the semantic elements (e.g., objects, action, scenes, actors, audio, etc.) into complete phrases or sentences. Further, the natural language templates 146 may be used to convey the relative evidentiary importance of each of the recounted semantic elements (obtained at block 416) by inserting words or phrases such as "likely," "probably," "certainly," etc. into the human-intelligible description or representation of the complex event. Additionally, the natural language templates 146 may be used to translate the relationship(s) obtained at block 418 into words or phrases such as "in," "at," "followed by," "after," "because," "based on," etc., and incorporate those and/or other transitional or prepositional-type phrases into the human-intelligible description or representation of the complex event.

At block 424, the method 400 presents the human-intelligible description or representation of the complex event to a user at the computing system 100. To do this, the method 400 may utilize, for example, a graphical user interface and/or a spoken natural language interface of the computing system 100. That is, the human-intelligible description or representation may be presented to the user in any suitable form including text, graphics, images, video clips, audio clips, spoken words, etc. Non-textual visual and/or audio elements that are representative of natural language descriptions of the complex event or the various semantic elements associated therewith may be presented, in some embodiments. For instance, the human-intelligible description or representation may be presented (visually or orally) as a sentence, paragraph, dialog, or short essay about the video, or as a collection of images, video clips, or audio clips extracted from the video (e.g., a collage or "highlight reel"). As an example, if the video depicts a wedding ceremony, the human-intelligible representation may include a still image of the bride and a sound clip of the vows.

In some visual presentations, words or phrases may be highlighted (e.g., using different colors) to indicate the semantic element or concept type with which they are associated. For instance, the description of the complex event may be presented in red, while descriptions of supporting actions may be presented in green, scenes in blue, and audio in yellow. Further, in a visual presentation, the semantic elements may be encoded with hyperlinks so that a user may select or "click" on the element to view (e.g., "jump to") the particular frame or segment of the video in which the semantic element was detected, or to expand or contract the description to a different level of detail. For example, in some embodiments, the name of the complex event (e.g., "skateboard trick") may be hyperlinked such that activating the hyperlink presents the additional, semantically meaningful details relating to the complex event (e.g., "standing on a board," "jumping," "falling," etc.).

Figure 7:
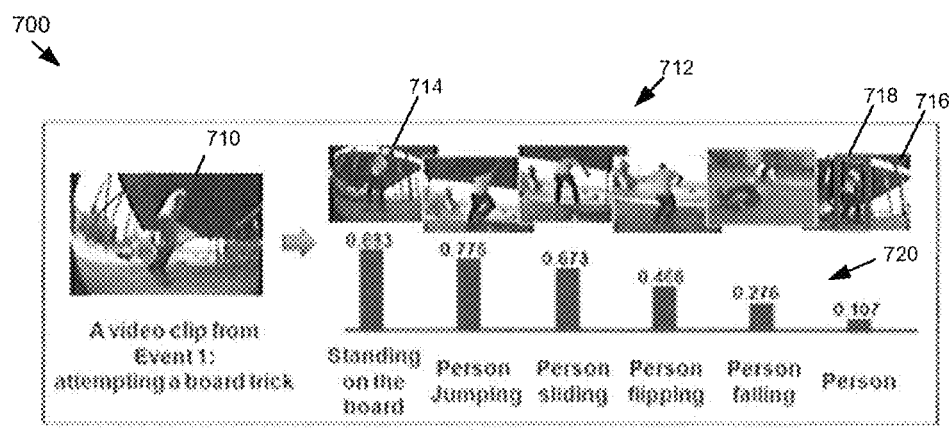
FIG. 7 illustrates an example of a semantic recounting of a complex event, which may be generated by the video search assistant of FIG. 1.

FIG. 7 illustrates an example of a semantic recounting 712 of a complex event, a "skateboard trick," depicted in a video 710. According to the complex event recounting performed e.g., by the method 400, the video 710 has been identified as likely depicting a skateboard trick based on the presence of the semantic elements 718: "standing on the board," "person jumping," "person sliding," "person flipping," "person falling," and "person." These semantic elements are listed in order of relative evidentiary importance 720 to the complex event determination (here, a higher value indicates greater importance, but this need not be the case). For instance, the action detected in frame 714 (and subsequent frames), "standing on the board" has been determined to have a higher strength of association (represented by the value 0.883) with the "skateboard trick" complex event than the actor depicted in frame 716, "person" (represented by the value 0.107). However, the fact that a "person" 718 (rather than an object or an animal, for example) has been detected in frame 716 is considered important to the overall complex event classification.

Figure 5:
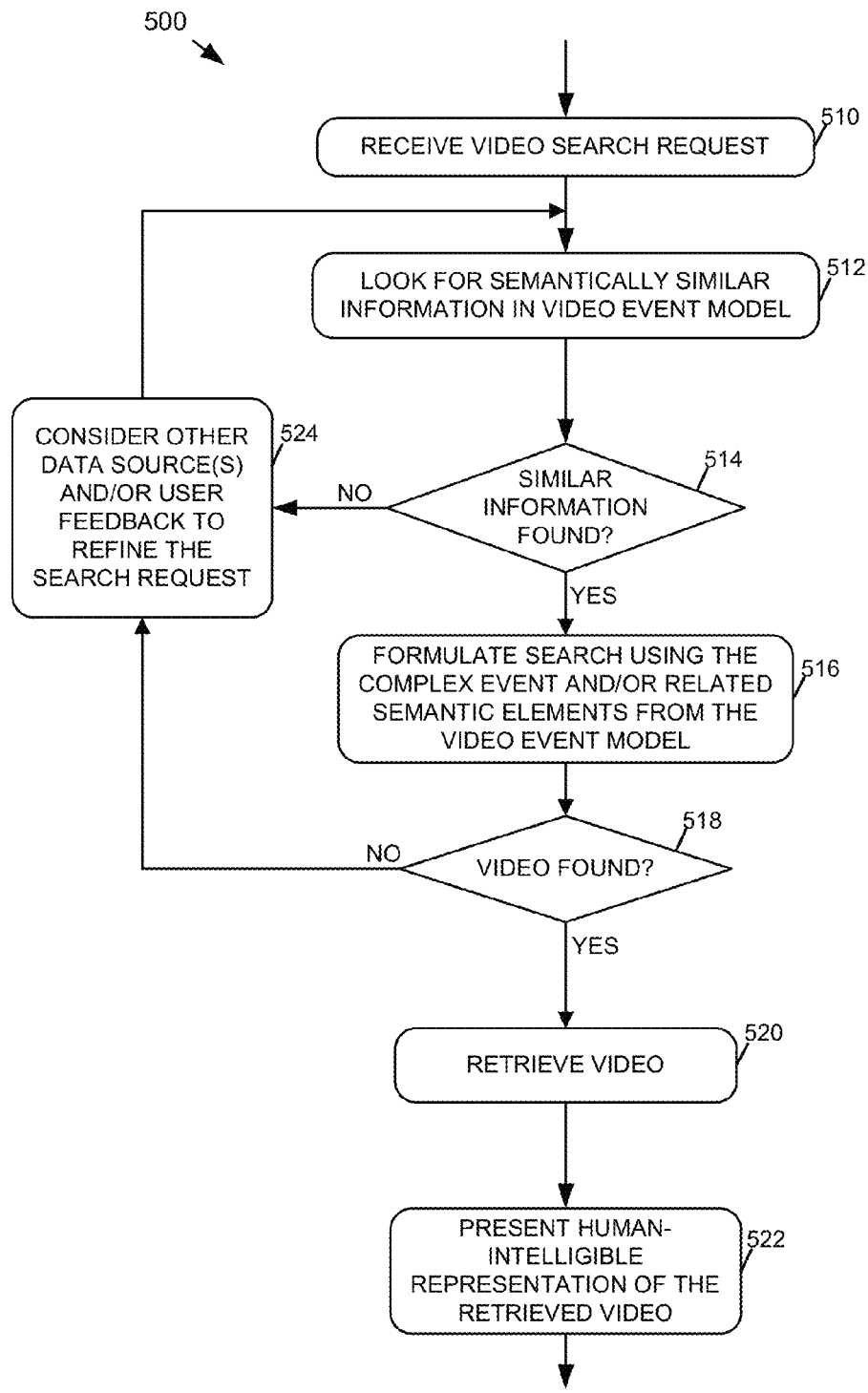
FIG. 5 is a simplified flow diagram of at least one embodiment of a method by which the video search assistant of FIG. 1 may perform search and retrieval for videos depicting one or more complex video events.

Referring now to FIG. 5, an illustrative method 500 for performing video search and retrieval, which may be embodied as computerized programs, routines, logic and/or instructions of the video search and retrieval interface 116 and/or one or more of the various modules of the video search assistant 110, is shown. At block 510, the method 510 receives a search request (e.g., a user-initiated search request 150). While described herein as a "video" search request, it should be understood that the user need not specifically identify it as such. In other words, the user may simply input a search term or other search input to a general-purpose search engine without specifically intending to look for videos, or without intending to search for videos exclusively. Nonetheless, with the video search assistant 110, the search request can be used to search for and retrieve videos corresponding to complex events that may be related to the search request. Additionally, as mentioned above, the search request may include a listing of semantic elements or search terms, or examples of these, such as example video clips, images, or sound clips. As an example, the search request may include an image corresponding to a certain brand of an object, such as a skateboard (which may have been obtained from an online shopping site, for example). In this case, the method 500 may identify videos of skateboard tricks (a complex event) that contain the particular brand of skateboard shown in the search request input. As another example, if the search request includes a video of a wedding ceremony, and the user wants to find other videos in which the bride is wearing the same wedding dress, the user may select the frame or frames (e.g., x-y-t cubes) in which the dress is depicted (from various angles, perhaps) in the input video. In response, the method 500 may search for other wedding videos in which the wedding dress appears.

At block 512, the method 500 looks for information in the video event model 114 that is semantically similar to the search request. For example, the method 500 may look for similar words or phrases in the global model 122 and use those to identify types or categories of complex events 126 that pertain to the search request. At block 514, the method 500 determines whether there is information in the video event model 114 that is semantically similar to the search request. If not, the method 500 proceeds to block 524, where it may consult other data sources 170 and/or additional user input to refine the search request, and then returns to block 512. If yes, the method 500 proceeds to block 516, where it formulates a search using the information from the video event model 114, found at block 512. To do so, the method 500 may incorporate semantic descriptions of a complex event and/or its associated semantic elements into the search query (either automatically or with user approval). At block 518, the method 500 conducts a search, e.g., of the video collection 120 or a portion thereof, to identify videos or video segments within videos that match the search request based on the complex event-enhanced search query. Alternatively, the method 500 may initially search the video-specific models 124 and from that, generate a list of videos or video segments that appear to match the search request. If no matching videos are found, the method 500 proceeds to block 524, described above. If one or more videos are found, the illustrative method 500 proceeds to block 520, where it retrieves the matching video(s) or at least text or thumbnail images of them. Additionally, at block 522, the method 500 presents a human-intelligible description or representation of each of the retrieved videos or video segments, which may be generated as described above with reference to FIG. 4, to the user in connection with the retrieved video. The human-intelligible description or representation may be presented to the user in a natural language format, or other suitable textual, non-textual visual, and/or audio format, as discussed above.

In some cases, the method 500 may be used to search for particular segments of interest within a video. For instance, if the user has a video recording of a movie, television show or sporting event, which may depict multiple complex events, the method 500 may be used to identify segments of the video that relate to a particular complex event. As an example, the method 500 may be used to search within a recording of the SUPER BOWL football game for all of the commercials. In this case, the human-intelligible representation may include interactive thumbnail still images of the first frame of each commercial played during the coverage of the football game. Similarly, in some embodiments, the method 500 may be applied to look for various complex events of interest within a movie or television show and identify them by semantic content (e.g., "birthday party," or "robbery," rather than simply by frame number).

Example Usage Scenarios

Figure 8:
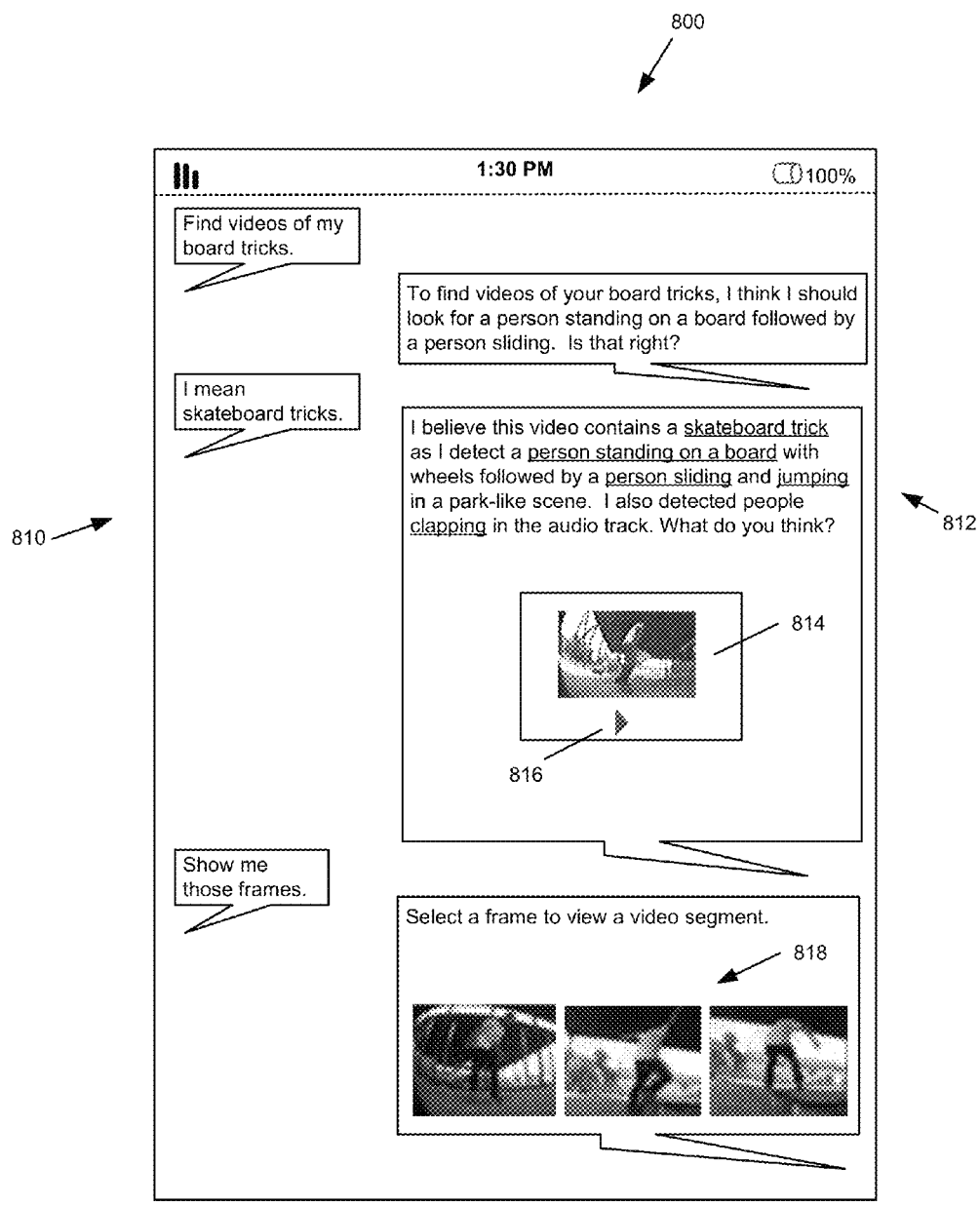
FIG. 8 illustrates an example of a user interaction that may occur in connection with the video search assistant of FIG. 1.

Referring now to FIG. 8, an example of human-device interaction involving the computing system 100, which may take place in connection with the use of the video search and retrieval interface 116, is shown. A display 800 presents user-supplied dialog 810 and system-supplied dialog 812 (which may be spoken/audio, alternatively or in addition to the visual form). The user initiates the dialog with a search request, "find videos of my board tricks." The video search and retrieval interface 116 responds to the search request by describing the complex event, "board trick," in terms of semantic elements ("person standing on a board," "person sliding") that it believes to be associated with the complex event. To make this determination, the interface 116 uses the video event model 114 to identify the complex event of interest and the semantic elements that have a high strength of association with the complex event. In response, the user clarifies the search request by indicating that he or she is looking for videos of "skateboard tricks." In response, the interface 116 conducts a search and retrieves a video, for which it displays a thumbnail image 814. The interface 116 also presents an explanation of the reasons why this particular video was retrieved in response to the search request. For instance, the interface 116 is able to distinguish board tricks from bicycle tricks even though skateboards and bicycles both have wheels. As shown, the explanation includes spatio-temporal indicators such as "followed by" and "in" as well as a causal indicator, "as." The underlined portions of the explanation correspond to semantic elements found in the video that are interactively hyperlinked. Such hyperlinks may be used to locate the depiction of the underlined semantic element in the video, to expand or contract portions of the natural language explanation, or to perform other appropriate functionality. For instance, clicking on the hyperlinked complex event, "skateboard trick," may expand or contract the ensuing description. The user may begin viewing the retrieved video by, e.g., activating a graphical user interface control 816 or issuing a spoken command.

The interface 116 may allow the user to provide feedback on the search. For example, the illustrative explanation presented by the system also includes a request for user feedback (e.g., "what do you think?"). In response, the user asks for more details, e.g., to see the frames of the video of the semantic elements identified in the description. In response to the user's request, the system presents interactive thumbnails 818 of the corresponding frames (e.g., the first frame of the video segments corresponding standing on a board, sliding, and jumping). At this point, the user may select a thumbnail to view the corresponding segment of the video.

Implementation Examples

Referring now to FIG. 9, a simplified block diagram of the illustrative computing system 100 in which the video search assistant 110 may be implemented is shown. While the computing system 100 is shown as involving multiple components and devices, it should be understood that in some embodiments, the computing system 100 may constitute a single computing device (e.g., a mobile electronic device, laptop or desktop computer) alone or in combination with other devices.

The illustrative computing system 100 includes a computing device 910, which may be in communication with one or more other computing systems or devices 942 via one or more networks 940. Illustratively, a portion 110A of the video search assistant 110 is local to the computing device 910, while another portion 110B is distributed across one or more other computing systems or devices 942 that are connected to the network(s) 940. Similarly, a portion 120A of the illustrative video collection 120 is local to the computing device 910 while another portion 120B is distributed across one or more of the other computing systems or devices 942. In other embodiments, however, the video search assistant 110 and/or the video collection 120 may be located entirely on the computing device 910 or portions of each may be located on different computing devices. In some embodiments, portions of the video search assistant 110 may be incorporated into other systems or interactive software applications. Such applications or systems may include, for example, operating systems, middleware or framework software, and/or applications software. For example, portions of the video search assistant 110 may be incorporated into or accessed by other, more generalized search engine or intelligent assistance applications.

The illustrative computing device 910 includes at least one processor 912 (e.g. a microprocessor, microcontroller, digital signal processor, etc.), memory 914, and an input/output (I/O) subsystem 916. The computing device 910 may be embodied as any type of computing device such as a personal computer (e.g., desktop, laptop, tablet, smart phone, body-mounted device, etc.), a server, an enterprise computer system, a network of computers, a combination of computers and other electronic devices, or other electronic devices.

Although not specifically shown, it should be understood that the I/O subsystem 916 typically includes, among other things, an I/O controller, a memory controller, and one or more I/O ports. The processor 912 and the I/O subsystem 916 are communicatively coupled to the memory 914. The memory 914 may be embodied as any type of suitable computer memory device (e.g., volatile memory such as various forms of random access memory).

The I/O subsystem 916 is communicatively coupled to a number of hardware components and/or other computing systems including one or more user input devices 718 (e.g., a touchscreen, keyboard, virtual keypad, microphone, etc.), one or more storage media 920, one or more location-based systems 922 (e.g., GPS), one or more sensors 924 (e.g., accelerometer, proximity sensor, compass, etc.), one or more video and/or still-image cameras 926, an optical character recognition system 928, an automated speech recognition system 930, one or more network interfaces 932, and one or more output devices 934 (e.g., speakers, LEDs, etc.). It should be understood that each of the foregoing components and/or systems may be integrated with the computing device 910 or may be a separate component or system that is in communication with the I/O subsystem 916 (e.g., over a network). For instance, the location based systems 922, the OCR system 928, and/or the ASR system 930 may be embodied as a separate device or system.

The storage media 920 may include one or more hard drives or other suitable data storage devices (e.g., flash memory, memory cards, memory sticks, and/or others). In some embodiments, portions of systems software (e.g., an operating system, etc.), framework/middleware (e.g., application-programming interfaces, object libraries, etc.), the video search assistant 110A, and/or the video collection 120A reside at least temporarily in the storage media 920. Portions of systems software, framework/middleware, the video search assistant 110A and/or the video collection 120 may be copied to the memory 914 during operation of the computing device 910, for faster processing or other reasons.

The one or more network interfaces 932 may communicatively couple the computing device 910 to a local area network, wide area network, personal cloud, enterprise cloud, public cloud, and/or the Internet, for example. Accordingly, the network interfaces 932 may include one or more wired or wireless network interface cards or adapters, for example, as may be needed pursuant to the specifications and/or design of the particular computing system 100.

The other computing device(s) 942 may be embodied as any suitable type of computing device such as any of the aforementioned types of devices or other electronic devices. For example, in some embodiments, the other computing devices 942 may include one or more server computers used to store portions 120B of the video collection 120. The computing system 100 may include other components, sub-components, and devices not illustrated in FIG. 9 for clarity of the description. In general, the components of the computing system 100 are communicatively coupled as shown in FIG. 9 by signal paths, which may be embodied as any type of wired or wireless signal paths capable of facilitating communication between the respective devices and components.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation of the video search assistant 110. Further, references herein to rules or templates are not meant to imply any specific implementation details. That is, the video search assistant 110 may store rules, templates, etc. in any suitable machine-readable format.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected. For example, while certain aspects of the present disclosure may be described in the context of user-generated or "in the wild" videos, it should be understood that the various aspects are applicable to other types of recorded multimedia events, such as surveillance videos, animated presentations, professionally-produced videos, recorded commercials, television shows, feature films, and the like.

The invention claimed is:

1. A video search assistant embodied in one or more machine readable storage media and accessible by a computing system to assist a user with a video search by:
receiving a user-specified search request;
determining a higher level complex event of interest, based on the user-specified search request;
accessing a video event model, the video event model comprising: (i) a plurality of semantic elements associated with a plurality of higher level complex events depicted in the plurality of videos, each higher level complex event evidenced by at least two different lower level complex events, each of the semantic elements describing one or more of a scene, an action, an actor, and an object depicted in one or more of the videos, and (ii) data indicative of evidentiary relationships of different combinations of semantic elements forming the lower level complex events, wherein the video event model is derived by: (i) executing one or more event classifiers on one or more dynamic low level features of the videos to identify one or more semantic elements associated with the dynamic low level features, (ii) computing a strength of association of the one or more semantic elements with ones of the lower level complex events, (iii) and computing a strength of association of the associated ones of the lower level complex events with the higher level complex event;
determining, based on the video event model, one or more semantic elements of interest associated with the higher level complex event of interest; and
formulating a search for one or more videos depicting the higher level complex event of interest, the search comprising one or more of the semantic elements of interest.

2. The video search assistant of claim 1, wherein the user-specified search request comprises one or more of a textual element, a non-textual visual element, and an audio element.

3. The video search assistant of claim 1, wherein the user-specified search request comprises one or more spatio-temporal regions of interest within a video segment.

4. The video search assistant of claim 1, accessible by a computing system to present one or more of the semantic elements of interest to a user, receive user input relating to the presented semantic elements, and modify the search based on the user input.

5. The video search assistant of claim 1, accessible by a computing system to identify a video likely depicting the higher level complex event of interest and present a natural language description of the video to a user.

6. The video search assistant of claim 1, accessible by a computing system to identify a video likely depicting the higher level complex event of interest and present to a user a natural language description of one or more segments of the video that relate to the higher level complex event.

7. The video search assistant of claim 1, accessible by a computing system to identify a video likely depicting the higher level complex event of interest and locate, in the identified video, one or more video segments likely depicting the higher level complex event of interest.

8. The video search assistant of claim 1, accessible by a computing system to determine the higher level complex event of interest based on data stored in a knowledge base comprising one or more of a non-publicly accessible knowledge base and a publicly accessible knowledge base.

9. The video search assistant of claim 1, wherein the video event model comprises data relating each of a plurality of complex event types to an associated set of semantic elements.

10. The video search assistant of claim 9, wherein the video event model comprises data relating to a relative evidentiary value associated with one or more of the semantic elements in each of the sets of semantic elements associated with each of the complex event types, and the video search assistant is accessible by a computing system to recognize the higher level complex event based on one or more of the relative evidentiary values.

11. The video search assistant of claim 1, wherein at least a portion of the video event model is derived using a machine learning technique.

12. The video search assistant of claim 1, wherein at least a portion of the video event model is generated based on user input.

13. The video search assistant of claim 1, wherein the video event model comprises ontological information relating to the lower level and the higher level complex events and the semantic elements.

14. The video search assistant of claim 1, accessible by a computing system to determine the higher level complex event of interest by algorithmically comparing the user-specified search request to one or more of the semantic elements in the video event model.

15. The video search assistant of claim 1, wherein the user-specified search request comprises one or more videos, and the video search assistant determines a higher level complex event of interest likely depicted in the one or more videos without the use of example training videos.

16. A video search assistant embodied in one or more machine readable storage media and accessible by a computing system to generate a description of a video to assist with a video search, by:
   accessing a set of semantic elements associated with the video, each of the semantic elements describing one or more of a scene, an action, an actor, and an object depicted in the video, wherein at least a portion of the set is, in combination, indicative of at least one lower level complex event;
   recognizing a higher level complex event as being likely depicted in the video, as evidenced by a combination of the at least one lower level complex event;
   algorithmically generating a human-intelligible representation of the higher level complex event based on the semantic elements evidencing the higher level complex event, the human-intelligible representation comprising one or more of: a natural language description, one or more non-textual visual elements representative of the natural language description, and one or more audio elements representative of the natural language description; and
   associating the human-intelligible representation with the video.

17. The video search assistant of claim 16, accessible by a computing system to omit from the human-intelligible representation semantic elements that do not evidence the higher level complex event.

18. The video search assistant of claim 16, accessible by a computing system to present the human-intelligible representation in response to a user-specified search request.

19. The video search assistant of claim 16, accessible by a computing system to receive user input relating to the human-intelligible representation and modify the video search based on the user input.

20. The video search assistant of claim 16, accessible by a computing system to determine a relative evidentiary value associated with each of the semantic elements evidencing the higher level complex event and formulate the human-intelligible representation based on the relative evidentiary values.

21. The video search assistant of claim 16, accessible by a computing system to determine a temporal, spatial, causal, or other relationship between at least two of the semantic elements evidencing the higher level complex event and include an indication of the relationship in the human-intelligible representation.

22. The video search assistant of claim 16, wherein one or more of the semantic elements evidencing the higher level complex event relates to audio included in the video, and the video search assistant is accessible by a computing system to include a description of the audio-related semantic element in the human-intelligible representation.

23. The video search assistant of claim 16, accessible by a computing system to associate an interactive hyperlink with a semantic element included in the human-intelligible representation and display an indication of the hyperlink in the human-intelligible representation, wherein the hyperlink may be user-activated to locate a portion of the video corresponding to the associated semantic element.

24. The video search assistant of claim 16, accessible by a computing system to associate an interactive hyperlink with a semantic element included in the human-intelligible representation and display an indication of the hyperlink in the human-intelligible representation, wherein the hyperlink may be user-activated to expand or contract the human-intelligible representation to a different level of detail.

25. The video search assistant of claim 16, wherein the human-intelligible representation describes the higher level complex event and the semantic elements evidencing the higher level complex event in an essay-like manner.

26. The video search assistant of claim 16, wherein the human-intelligible representation describes the complex event and the semantic elements evidencing the higher level complex event in a dialog-like manner.

27. The video search assistant of claim 16, accessible by a computing system to recognize the higher level complex event by referencing a video event model comprising data relating each of a plurality of complex event types to an associated set of semantic elements.

28. The video search assistant of claim 27, accessible by a computing system to assign a relative evidentiary value to one or more of the semantic elements in each of the sets of semantic elements associated with each of the complex event types, and recognize the higher level complex event based on one or more of the relative evidentiary values.

29. The video search assistant of claim 16, accessible by a computing system to determine the set of semantic elements associated with the video by algorithmically extracting a plurality of features from the video and classifying each of the extracted features using a set of classifiers.

30. A video search assistant embodied in one or more machine readable storage media and accessible by a computing system to recognize a video as likely depicting a complex event, by, algorithmically:
- identifying a plurality of visual and non-visual features included in the video;
- deriving a plurality of semantic elements from the visual and non-visual features, each of the semantic elements describing one or more of a scene, an action, an actor, and an object depicted in the video;
- deriving a plurality of lower level complex events comprising combinations of the semantic elements;
- recognizing a higher level complex event as being likely depicted in the video based on a combination of the lower level complex events; and
- associating the higher level complex event with the video.

31. The video search assistant of claim 30, accessible by a computing system to identify the visual and non-visual features by one or more algorithmic feature extraction techniques.

32. The video search assistant of claim 30, accessible by a computing system to recognize a geographic location of one or more of the scenes depicted in the video and associate the geographic location with one or more of the semantic elements.

33. The video search assistant of claim 30, accessible by a computing system to recognize audio occurring in the video and associate the audio with one or more of the semantic elements.

34. The video search assistant of claim 33, accessible by a computing system to recognize speech included in the recognized audio and associate the speech with one or more of the semantic elements.

35. The video search assistant of claim 30, accessible by a computing system to recognize text depicted in the video and associate the text with one or more of the semantic elements.

36. The video search assistant of claim 30, accessible by a computing system to derive one or more of the semantic elements algorithmically using a set of classifiers.

37. The video search assistant of claim 36, accessible by a computing system to derive one or more of the classifiers using a machine learning technique.

38. The video search assistant of claim 30, accessible by a computing system to generate one or more of the semantic elements based on user input.

39. The video search assistant of claim 30, accessible by a computing system to recognize the higher level complex event by referencing a video event model comprising data relating each of a plurality of complex event types to an associated set of semantic elements.

40. The video search assistant of claim 39, accessible by a computing system to assign a relative evidentiary value to one or more of the semantic elements in each of the sets of semantic elements associated with each of the complex event types, and recognize each complex event based on one or more of the relative evidentiary values.

41. The video search assistant of claim 39, accessible by a computing system to create at least a portion of the video event model using a machine learning technique.

42. The video search assistant of claim 39, wherein the video event model comprises ontological information relating to the higher level complex events and the semantic elements.

43. The video search assistant of claim 30, accessible by a computing system to recognize another video as likely depicting the higher level complex event without the use of example training videos.

44. The video search assistant of claim 43, accessible by a computing system to recognize the other video as likely depicting the higher level complex event by comparing a semantic description of the other video with the plurality of semantic elements.

45. A system for creating a highlight reel by algorithmically recognizing and extracting complex events from a video, the system comprising a plurality of instructions embodied in one or more non-transitory machine readable storage media, the instructions executable by a processor to cause an electronic device to:
- detect a plurality of visual features in the video;
- identify a plurality of semantic elements associated with the detected visual features;
- select a subset of the semantic elements, the subset comprising semantic elements evidencing at least two different actions associated with a plurality of events;
- select a subset of the associated plurality of events indicating the complex event;
- extract, from the video, a plurality of images corresponding to the actions associated with the complex event; and
- by a display of the electronic device, present the extracted images as a highlight reel of the complex event.

* * * * *